March 18, 1952 W. D. GOODALE, JR., ET AL 2,589,800

TELEPHONE SIGNALING SYSTEM

Filed May 19, 1950

INVENTORS: W. D. GOODALE JR.
W. H. MARTIN

BY J. W. Schmied

ATTORNEY

Patented Mar. 18, 1952

2,589,800

UNITED STATES PATENT OFFICE 2,589,800

TELEPHONE SIGNALING SYSTEM

Walter D. Goodale, Jr., Summit, and William H. Martin, Short Hills, N. J., assignors to Bell Telephone Laboratories, Incorporated, New York, N. Y., a corporation of New York Application May 19, 1950, Serial No. 163,032

5 Claims. (Cl. 179—87)

This invention relates to selective station signaling means, and more particularly to improvements in telephone subscriber's station calling.

Recent developments in improved narrow band frequency responsive tuned reed relays of the type disclosed in Patent 2,502,339 granted to G. E. Perreault March 28, 1950, have made possible numerous improvements and advances in the selective switching art, and particularly in telephone signaling means. An improved multi-party selective signaling system employing a distinctively tuned reed at each subscriber's station on a telephone party line is disclosed by the copending application of F. J. Singer and L. J. Stacy, Serial No. 73,373, filed January 28, 1949, for which Patent 2,532,125 issued on November 28, 1950. An improvement over the system of that application is disclosed by the copending application of A. H. Inglis and L. E. Krebs, filed concurrently with the present application and bearing the Serial No. 163,002. The present application relates to certain improvements over the arrangements in these referenced disclosures.

An object of the invention is to provide a telephone subscriber's station at which the intensity of each successive calling signal is automatically increased by increments from the start of ringing until maximum output is reached.

Another object of the invention is to provide such automatic incremental increases in ringing signal loudness at the subscriber's station without the necessity of complex or costly ringing potential sources at the central office.

A further object of the invention is to provide such controlled subscriber station ringing in a telephone system which may be adapted to selectively ring any one of a very large number of parties on a common party line.

A still further object of the invention is to provide a telephone subscriber's station set in which the above-mentioned objects are achieved and also in which no separate subscriber calling device, either bell ringer or loudspeaker, is required.

Figure 1:
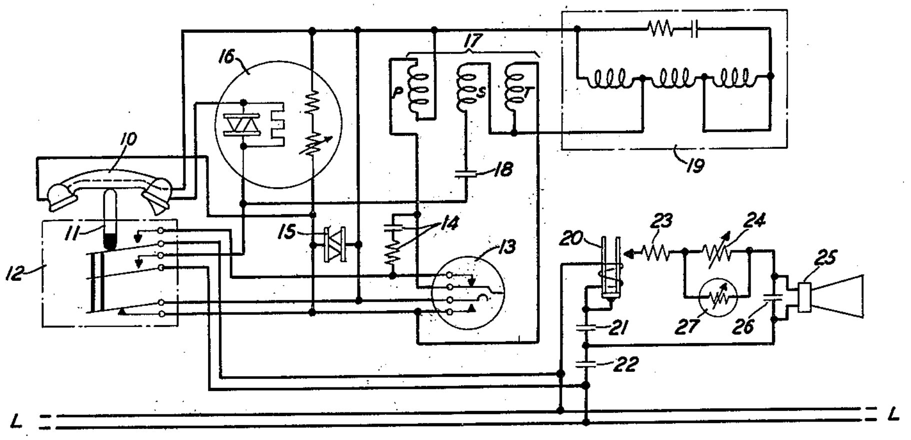
Figure 2:
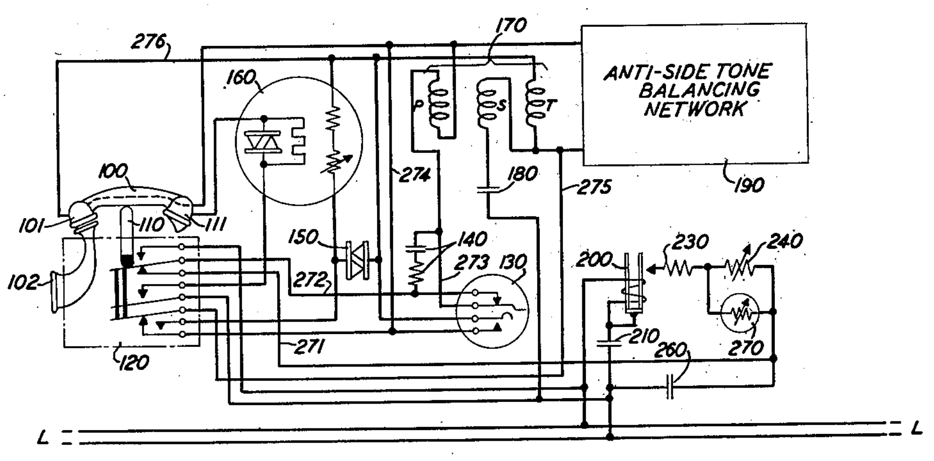

Characteristics and advantages of the invention will be apparent from a study of the following detailed description taken in reference to the accompanying drawing, in which:

Fig. 1 represents a schematic circuit diagram showing a preferred embodiment of the invention as adapted to a telephone subscriber's station having a loudspeaker type of acoustic transducer; and Fig. 2 represents a schematic circuit diagram of an alternative arrangement of the invention adapted to a telephone subscriber's station in which no auxiliary calling device, either bell ringer or loudspeaker, is employed.

Referring now in greater detail to the circuit of Fig. 1, a subscriber's telephone handset 10 is shown resting on the plunger 11 of a cradle switch 12. The contacts of a conventional telephone dial are shown at 13, with a resistor and condenser 14 in series across the usual dial pulsing contacts as means for suppressing radio interference during the dialing operation. The full wave varistor 15 is connected across the subscriber's receiver, in the handset 10, as a peak voltage limiter to reduce disturbing clicks which might otherwise be caused by switching operations elsewhere in the system. The varistor, heating unit and thermistor shown together in 16 comprise an equalizer circuit for the purpose of compensating for variations in attenuation caused by different length loops, as described more fully in the copending application of N. Botsford et al., Serial No. 793,170, filed December 22, 1947. The antisidetone induction coil 17, comprising primary, secondary and tertiary windings P, S and T, may be a type of telephone station induction coil which is well known in the art. The direct-current blocking condenser 18 is of sufficient capacitance to present a low impedance to voice frequency signals. The network 19 represents a balancing network for the antisidetone circuit, the preferred embodiment of which employs a coil of the general type disclosed by E. Dietze and J. W. Foley, Patent 2,120,973, issued June 21, 1938, and which functions to suppress sidetone in the subscriber's receiver as more fully described in aforesaid copending application of N. Botsford et al.

The tuned reed relay 20 is preferably of the type disclosed in the aforesaid patent of G. E. Perreault selectively responsive to a narrow band of frequencies within the voice frequency range, although other forms of frequency sensitive relay devices may be employed. The condenser 21 is of a capacitance which presents a low impedance to alternating currents in the voice frequency range, including the frequency to which relay 20 is tuned, while presenting a relatively higher impedance to low frequency currents of the magnitude employed for station calling. The direct-current blocking condenser 22 presents a low impedance to a wider range of alternating-current frequency, including voice frequency and calling frequency signals. The fixed resistor 23 limits current flow through the vibrating contacts of tuned reed relay 20, thereby reducing the contact deterioration due to sparking. Variable resistor 24 is a manually adjustable rheostat by means of which the subscriber may control the volume level of sound radiated from his station signal device 25, as more fully described in copending application of A. H. Inglis and L. E. Krebs, which is filed concurrently herewith and the full disclosure of which is incorporated herein by reference. The station signal device 25 is an electro-acoustic transducer which is preferably incorporated into the subscriber's station set in the manner disclosed by copendng application of E. E. Mott, Serial No. 107,300, filed July 28, 1949, now Patent No. 2,578,367, granted December 11, 1951, although other types of electrically driven loudspeakers, including those remotely situated with respect to the telephone station set, may be used. The fixed condenser 26 cooperates with resistor 23 to protect the vibrating contacts of relay 20 from electrical transients which would erode them. The inductance of relay winding 20 in series with the capacitance of condenser 21 comprises a filter to prevent the high frequency components of the calling signal as modulated by the vibratile relay contact from feeding back into the line L and causing crosstalk. A separate inductor or resistor (not shown) might be included in this portion of the circuit for further filtering purposes, although in general the inductive reactance of the tuned relay 20 is considered to be sufficient for this purpose.

The variable resistor 27 is a device having a negative thermal coefficient of resistance of such a characteristic that its resistance decreases very greatly with relatively slight increases in temperature. This may be a thermistor of the general type disclosed by R. O. Grisdale in Patent 2,258,646, issued October 14, 1941, or any suitable modification thereof. In the prefered embodiment of the invention the thermistor 27 has a relatively long cooling time constant, of the order of 25 seconds, and a resistance at low currents of the order of 50,000 ohms to 100,000 ohms, although it is to be understood that these values of resistance and cooling time constant may be varied in accordance with the parameters selected for other components of the associated circuits.

Additional subscriber stations according to the circuit of Fig. 1 may be connected to the same line L, and selective signaling is accorded any station on the common line by equipping each station with a differently tuned reed relay, as at 20, and providing a corresponding plurality of different voice frequency signal tone sources at the central office, in the manner disclosed by aforesaid copending application of A. H. Inglis and L. E. Krebs.

Selective station signaling is then accomplished by combining the selected voice frequency signal with the standard low frequency signal at the central office and applying the combination of such signals to the connecting line L. With the called subscriber's handset resting on the plunger 11 of cradle switch 12, as shown in Fig. 1, the talking portion of the station circuit is disconnected from the line and only the call indicating portion of the circuit, including the tuned reed relay 20 and acoustic transducer 25, remain connected to line L. Assuming that the operator at the central office, or the automatic telephone switching equipment at the central office, has applied a signaling tone of the frequency to which reed 20 is tuned, combined with the low frequency signal which may be the conventional 20-cycle ringing signal, the high frequency signal applied to the driving coil of relay 20 sets the tuned reed at the subscriber's station into vibration and causes intermittent closing of the relay's vibrating contacts. Upon such closure of the contacts of relay 20 a circuit is intermittently completed for the passage of the low frequency current, as modulated by the operation of vibrating relay 20, through the resistors 23 and 24 to operate the electroacoustic transducer 25.

At this moment in the sequence of station calling, the thermistor 27 comes into operation. Inasmuch as thermistor 27 is connected in parallel across the manually adjustable resistor 24, some of the signaling current which passes through the vibrating contacts of relay 20 to operate the transducer 25 will pass through thermistor 27, the amount of current which passes through the thermistor being determined by the adjustment of resistor 24, in such manner that the greater the resistance of resistor 24 the more current will flow through thermistor 27. As the ringing signal at the central office is applied to the line intermittently, the established practice in telephone systems being the use of a signal which is on for 2 seconds and off for 4 seconds, each successive application of ringing signal will raise the temperature of thermistor 27 and thereby lower the internal resistance of this element. Because of the slow cooling constant of thermistor 27, the brief silent intervals between successive applications of ringing current are of insufficient duration to allow any appreciable increase of thermistor resistance. Thus, with each successive application of ringing current the circuit impedance of resistor 24 and thermistor 27 in parallel becomes less, and the voltage level of ringing signal applied to transducer 25 becomes greater, to produce successively louder ringing sounds from the electroacoustic transducer.

With the circuit arrangement of Fig. 1 as described above, it will be apparent that even though the telephone subscriber may adjust his manual rheostat 24 for maximum value of resistance so as to produce a very low level, or soft tone, ringing sound when his telephone station is called, if he fails to answer the call promptly the level of calling sound will increase gradually with each succcessive ring, until the thermistor 27 has warmed up to a point at which it practically short-circuits the rheostat 24 and maximum level loud signaling is produced in the transducer 25. This mode of ringing operation will provide an inducement for the subscriber to answer his phone promptly which will facilitate more rapid completion of telephone calls and thereby reduce the holding time of central office switching equipment, or of an operator in manual offices. Some provision for automatic increases in calling signal intensity at the telephone subscriber's station is desirable where subscribers are provided with a manually adjustable volume control for their own convenience, because without such provision many subscribers may forget that they have previously adjusted their volume control to a very low level when they subsequently go into another part of their premises some distance removed from the telephone set, where they would be unable to hear the telephone call if it remained at such a low level, or when they turn on a vacuum cleaner or radio, or in any way increase the level of local noise at their station.

Referring now in greater detail to the circuit of Fig. 2 in the drawing, we see an embodiment of the invention in a telephone subscriber's station set wherein the telephone receiver serves as the electromagnetic driving unit of a horn loudspeaker without requiring a separate transducer device as shown at 25 in Fig. 1. In the disclosure of Fig. 2 the receiver 101 of handset 100 is adjacent to and substantially aligned with the small mouth opening of a folded horn 102 which in the preferred embodiment is mounted in and forms an integral part of the telephone subscriber's station set base member in substantially the manner disclosed by Fig. 1 of Patent 2,392,321 issued to R. E. Hersey on January 8, 1946. The remaining elements of the circuit of Fig. 2 substantially correspond to their counterparts in the circuit of Fig. 1, with the telephone handset 100 resting on plunger 110 of cradle switch 120 which operates in an obvious manner to disconnect the transmitter 111 from the line L when the handset 100 is resting on the cradle switch. The full wave varistor 150 is a peak limiter which functions in the same manner as the corresponding element 15 of Fig. 1. The equalizer 160 in Fig. 2 is identical with the equalizer 16 of Fig. 1 and functions in the same manner to compensate for variations in attenuation due to different length loops. The dial contacts 130 of Fig. 2 are identical with the dial 13 of Fig. 1, as also the dial filter 140 of Fig. 2 is identical with the corresponding filter 14 of Fig. 1. The induction coil 170 of Fig. 2 comprising primary, secondary and tertiary windows P, S and T may be a conventional telephone induction coil as described in reference to element 17 of Fig. 1. The direct-current blocking condenser 180 of Fig. 2 corresponds to the element 18 of Fig. 1, and the antisidetone network 190 of Fig. 2 may be identical with the circuit element 19 of Fig. 1. The tuned reed relay 200 of Fig. 2 may be of the same type as the tuned reed relay 20 of Fig. 1, and likewise the fixed condensers 210 and 260 of Fig. 2 correspond respectively to condensers 21 and 26 of Fig. 1. The fixed resistor 230, variable resistor 240 and thermistor 270 of Fig. 2 correspond respectively to resistance elements 23, 24 and 27 of Fig. 1.

Signaling operation of the circuit of Fig. 2 is as follows: with the telephone handset 100 in position on the cradle as illustrated by the drawing of Fig. 2 the switchhook contacts of cradle switch 120 have disconnected the handset transmitter 111, associated equalizer 160 and peak limiter 150 from connection with the line L. The dial filter 140 is short-circuited by the pulsing contacts of dial 130 and the station is in condition to be called. When the operator, or the automatic switching equipment, at the central office applies a calling signal comprising a selected high frequency tone which corresponds to the tuning of reed relay 200, in combination with a low frequency ringing signal (which may be the conventional 20-cycle signal) to the line L, the capacitor 210, which presents a low impedance to the high frequency signal while offering a relatively high impedance to the low frequency signal, permits the high frequency signaling current on the line to energize the driving coil of relay 200. Operation of the reed relay 200 permits the combination low frequency signal as modulated by the high frequency vibration of relay 200, to flow intermittently through resistors 230, 240 and thermistor 270, thence through the conductor 271 and the closed upper contact of switchhook 120 to the conductor 272, thence through the closed pulsing contact of dial 130 to conductor 273, thence through the primary winding P of induction coil 170, via conductor 274 to the lower closed contact of switchhook 120 to conductor 275 and the secondary winding of induction coil 170, thence through the direct-current blocking condenser 180 back to the other side of line L. In this circuit the primary and secondary windings P and S of induction coil 170 are connected in series to form a unitary primary circuit of a step-down transformer having the tertiary winding T as the secondary or low voltage side of the transformer. From the drawing of Fig. 2 it is apparent that this tertiary winding T is connected across the telephone receiver 101 by means of conductors 275 and 276, through the lower closed contact of switchhook 120. Thus the complex alternating-current calling signal, comprising the selected high frequency tone in combination with the low frequency ringing signal, after passing through tuned reed relay 200 is transformed by the induction coil 170 and applied directly to the low impedance telephone receiving unit 101. The sounds thus generated by the receiver 101 are coupled efficiently to the air by means of the acoustic horn 102 and serve to attract the attention of the telephone subscriber.

The subscriber at the station of Fig. 2 may adjust the volume of his calling signal by means of the manually operated rheostat 240 in the same manner that the subscriber at the station of Fig. 1 may limit the volume of his station call by means of rheostat 24. Upon successive applications of constant intensity ringing current to the line L of Fig. 2, thermistor 270 will assume successively lower values of resistance and thereby increase the intensity of the calling signal radiation in the same manner that the thermistor 27 operated in reference to Fig. 1 above. When the subscriber lifts his handset 100 in response to a call, contacts of cradle switch 120 disconnect the induction coil from the thermistor contact of the reed selector, remove the short circuit across the antisidetone network, and connect the induction coil to the line with the other circuit elements including the receiver 101, transmitter 111, equalizer 160, varistor 150 and condenser 180 arranged in the usual way for talking purposes. This circuit permits a direct current through the loop and thus signals the central office that the subscriber is answering his call and that the ringing signal may be removed from the line. When the call is completed and the handset 100 is restored to its cradle the circuit of Fig. 2 is again in condition for receiving another call.

It will be apparent that any desired number of subscribers' stations according to the circuit of Fig. 1 or Fig. 2 may be connected on a common party line and that each of said stations so connected may be selectively signalled by the simple expedient of providing differently tuned reed relays at each station and by having a corresponding plurality of different frequency signal sources at the central office which may be selectively applied to the connecting party line according to whichever station it is desired to call. It will also be apparent that additional electroacoustic transducers as illustrated by element 25 in Fig. 1 may be bridged across the indicated electroacoustic transducer at stations employing the circuits of either Fig. 1 or Fig. 2 and that such additional transducers may be remotely situated with respect to the telephone station set. It is to be undertsood that the invention is not limited to the specific circuits of the preferred embodiment herein disclosed but that many changes and variations may be made by those skilled in the art without departing from the spirit of the invention as defined by this specification and the appended claims.

What is claimed is:

1. A telephone station comprising a tuned reed relay having a driving coil and a vibratile contact, a thermally sensitive variable resistance having a negative temperature coefficient of resistance, a condenser, and an electromagnetic acoustic transducer, a two-conductor line connecting with said station, means connecting the driving coil of said relay in series with said condenser across said line, means connecting said transducer in series with said variable resistance, means connecting one terminal of said transducer and resistance combination to one conductor of said line, means connecting the other terminal of said transducer and resistance combination to one terminal of said vibratile contact and further means connecting the other terminal of said vibratile contact to the other conductor of said line.

2. In a telephone station connected to a pair of external conductors, a tuned relay operable by a low voltage signal of narrow band frequency characteristic, a thermally sensitive variable resistance, an acoustic transducer, means connecting said relay to said pair of conductors, and means comprising said relay for connecting said transducer and said variable resistance to said conductors in such manner that electrical signal voltages applied across said conductors produce current through said resistance and transducer, and upon successive applications of signal voltages said thermally sensitive resistance varies to permit successively greater current through said transducer.

3. A telephone station signaling system comprising a subscriber station having an acoustic transducer, a line connecting said station with a switching office and other stations, a source of signal currents at said office, a tuned reed relay having a driving coil and vibratile contacts at said subscriber station, means connecting the driving coil of said relay across said line, a thermally controlled variable resistance, and means including said thermally controlled variable resistance and the vibratile contacts of said relay for connecting said transducer to said line in such manner that said transducer is energized by signaling currents applied to said line at the switching office, and continued application of signaling currents varies said resistance to increase the energization of said transducer.

4. A telephone station having a talking and a signaling condition, said station comprising a transmitter and a receiver, a tuned reed relay having a driving coil and vibratile contacts, a thermally sensitive variable resistance, a step-down transformer having a primary and a secondary, a switchhook having a non-operated position and an operated position, a two-conductor line connected with said station, means connecting the driving coil of said relay across said line, means including said switchhook in non-operated position for connecting the primary of said transformer in series combination with said variable resistance and said vibratile contacts to condition said station for signaling, means connecting said series combination across said line, means connecting said receiver to the secondary of said transformer, and further means including said switchhook in operated position for disconnecting said series combination and for conditioning said transmitter and receiver for talking.

5. In a telephone station, a transmitter, a receiver, a switchhook, an acoustic horn having a small mouth opening and a large mouth opening, said receiver in its idle position resting upon said switchhook adjacent to and substantially aligned with the small mouth opening of said horn, a tuned relay having a coil winding and a vibratile contact, a temperature sensitive variable resistnace, amplifying means having an input and an output circuit, means for connecting said station to an external line, means connecting the coil winding of said relay to said line, means including said switchhook for connecting said resistance and said vibratile contacts in combination with the input circuit of said amplifying means and for connecting said combination with said line, means connecting said receiver with the output circuit of said amplifying means, and further means including said switchhook when operated by lifting of said receiver for disconnecting said combination and for conditioning said transmitter and receiver for talking.

WALTER D. GOODALE, JR.
WILLIAM H. MARTIN.

REFERENCES CITED

The following references are of record in the file of this patent:

UNITED STATES PATENTS

| Number | Name | Date |
|---|---|---|
| 978,695 | Coughrean | Dec. 13, 1910 |
| 1,279,882 | Kuhn | Sept. 24, 1918 |
| 1,295,454 | Egerton | Feb. 25, 1919 |
| 1,852,045 | Edwards | Apr. 5, 1932 |
| 2,332,448 | Inglis | Oct. 19, 1943 |
| 2,340,798 | Deal | Feb. 1, 1944 |
| 2,455,286 | Shann | Dec. 7, 1948 |